United States Patent [19]
DeVito et al.

[11] 3,943,661
[45] Mar. 16, 1976

[54] PLASTIC FLOWER BASKET

[76] Inventors: Joseph DeVito, 26 Villa Lane, Smithtown, N.Y. 11787; Donald L. Tendrup, 32 Delmarie Lane, Nesconset, N.Y. 11767

[22] Filed: Apr. 21, 1975

[21] Appl. No.: 569,921

[52] U.S. Cl. .................. 47/35; 47/38; 47/34 A; 220/23.83
[51] Int. Cl.² .................. C10G 9/02; C10G 27/00
[58] Field of Search ............ 47/34 R, 34.1, 34.2, 35, 47/38

[56] References Cited
UNITED STATES PATENTS

| | | | |
|---|---|---|---|
| 101,907 | 4/1870 | O'Neil | 47/35 |
| 1,297,484 | 3/1919 | Lutey | 47/34.1 |
| 1,648,570 | 11/1927 | White | 47/34.2 |
| 1,710,878 | 4/1929 | Kelso | 47/34 R |
| 2,504,031 | 4/1950 | Manning | 47/38 |
| 2,605,588 | 8/1952 | Lindstaedt | 47/38 |
| 2,818,681 | 1/1958 | Coplen | 47/34 R |
| 3,631,627 | 1/1972 | Van Zijverden | 47/34 R |
| 3,867,788 | 2/1975 | Mickelson | 47/35 |

FOREIGN PATENTS OR APPLICATIONS

| | | | |
|---|---|---|---|
| 1,270,324 | 12/1968 | Germany | 47/34 |

*Primary Examiner*—Edgar S. Burr
*Assistant Examiner*—James R. Feyrer
*Attorney, Agent, or Firm*—Bauer, Amer & King

[57] ABSTRACT

It is the custom in the trade to designate a "pot," which in use is suspended from an elevated support and whether used for a flower or a plant, as a "flower basket."

2 Claims, 13 Drawing Figures

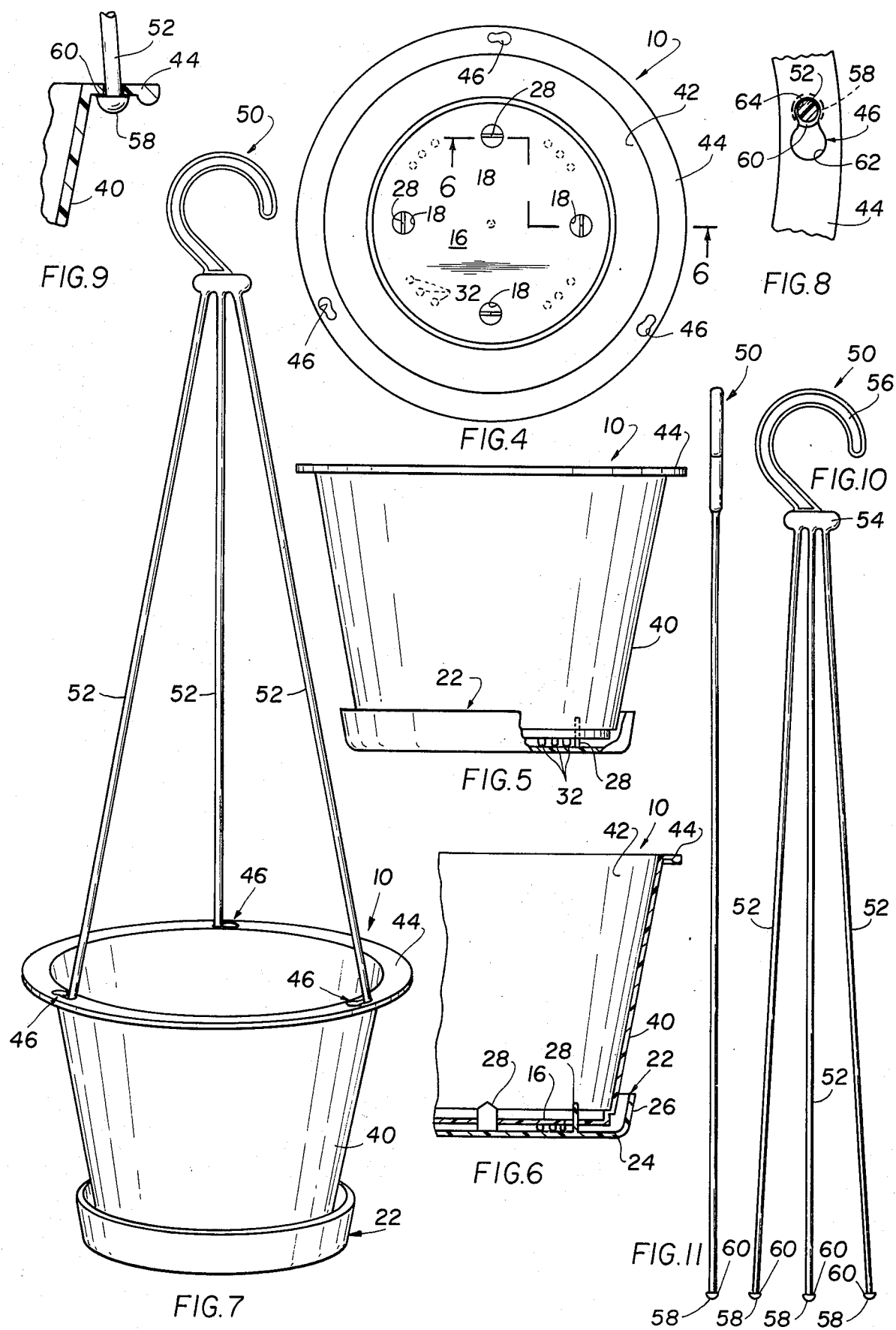

PLASTIC FLOWER BASKET

The present invention relates to an all plastic flower basket, wherein the cylindrical body and bottom saucer for said body are readily snapped into their connected relation, and wherein an injection molded hook with three depending connecting members are separated from their side-by-side relation, provided by their common molding plane, into an outwardly diverging relation preparatory to establishing a connection with the cylindrical body at three circumferentially spaced locations.

The present invention relates to improvements for an all plastic flower basket (i.e. a "pot"-type container for a plant or flower which in use is supported by suspension from above), the improvements, more particularly, resulting in economical mass production and facilitated assembly of the flower basket.

As generally understood, the three components of a typical flower basket are the pot or basket, a bottom saucer for same, and a member for completing the connection between the basket and an elevated point of support. In known flower baskets, the manufacture and assembly of these three components are unduly complicated, thereby unnecessarily adding to the cost of the product.

Broadly, it is an object of the present invention to fabricate each of the three components economically using plastic, and to achieve facilitated assembly thereof simply by snapping the parts together in a friction fit. Specifically, it is an object to provide for the snapping of the bottom saucer about the bottom of the basket, and to use a connector, which is economically injection molded (i.e. molded in a single molding plane) for making a circumferential connection about the basket opening, said circumferential or multi-plane locations for said connections being permitted by the pliability of the plastic material of construction of said injection molded connector.

A three-part flower basket demonstrating objects and advantages of the present invention includes a flower basket, a bottom saucer for said basket, and a plastic molded connector for suspending said flower basket and saucer in connected relation with each other from an elevated support. The flower basket is formed as a cylindrical body bounding a compartment for a supply of earth for growing plants in said basket, said body having about its upper opening a circular laterally extending flange which is molded with three keyhole slots circumferentially spaced thereabout. Completing the construction of the basket are four circumferentially spaced openings in its bottom wall which cooperate with four upstanding connecting projections on the bottom saucer to provide, when the projections are thrust in a force fit through said openings, a connected relationship of the saucer with the flower basket. The last component, namely, the plastic molded connector, is formed with three connecting members which during the suspension of the flower basket have an operative condition circumferentially spaced from each other and diverging outwardly from a common point to their connection in the keyhole slots of the flower basket. Each said connecting member has an enlarged-sized projection at its end which is adapted to be projected through a cooperating keyhole slot and laterally snapped into place therein for completing its connection to the flower basket. A hook extends from the upper juncture of the connecting members and is useful in completing a connection between the connector and the elevated support for the flower basket. Lastly, a pliable plastic material of construction is used in the molding of the connecting members, such that although these members are molded in a common molding plane, after said molding said connecting members are readily separated into plural planes as required by their operative outwardly diverging condition, said separating movement being permitted by the pliability of the plastic material of construction.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 3A:
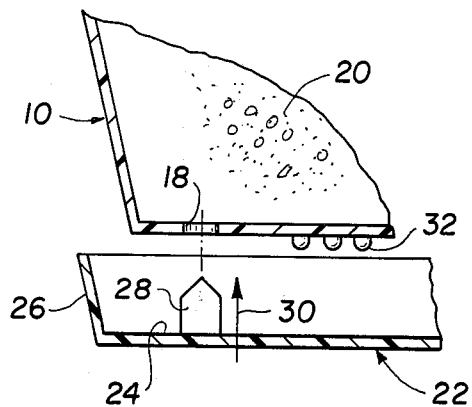
Figure 3B:
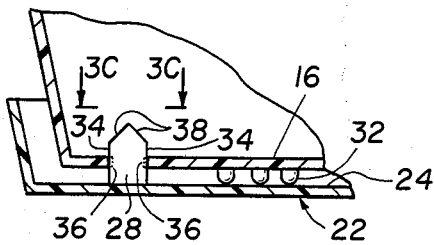
Figure 3C:
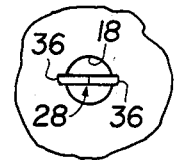

FIGS. 3A, 3B and 3C illustrate the manner in which the friction fit connection is established between the bottom saucer and the flower basket. Specifically, progressive examination of FIGS. 3A and 3B illustrate how the upstanding connecting projections of the bottom saucer are projected through the drainage openings in the bottom of the flower basket to complete the connection therebetween. FIG. 3C is a plan view, as seen in the direction of the arrows 3C—3C of FIG. 3B, wherein the friction fit is more particularly demonstrated and wherein there is a showing, which is slightly exaggerated, of the slight rupture which occurs in the wall bounding each drainage opening in order to accommodate said upstanding projection of the bottom saucer.

FIGS. 4, 5 and 6 are concerned with structural details of the flower basket. Specifically, FIG. 4 is a plan view of the flower basket illustrating both the keyhole slot by which said flower basket is suspended and also the connection of the bottom saucer in the drainage openings of the bottom wall of said flower basket;

FIG. 5 is a side elevational view, partially broken away, illustrating further structural details of the connection of the bottom saucer about the bottom of the flower basket; and FIG. 6 is a side elevational view, in cross section taken along lines 6—6 of FIG. 4, illustrating further structural details of the flower basket and bottom saucer.

FIG. 7 is a perspective view illustrating the complete assembly of the flower basket, its bottom saucer, and the connector by which the flower basket is suspended from an elevated support;

FIG. 8 is a partial plan view, in section, illustrating how the connection is made between the connector and the flower basket using the keyhole slots;

FIG. 9 is a side elevational view illustrating further details of the connection which is provided by each keyhole slot.

FIGS. 10 and 11 illustrate structural details of the connector per se, the same being front and side elevational views respectively of this component of the inventive combination.

Flower pots are, of course, well known and have long been used for the growing of plants and flowers, particularly in the home. When for decorative purposes or the like, the pot is suspended from an elevated support, it is usually referred to as a "flower basket," even though structurally it is identical to a "pot," and even though it is used for the growing or cultivation of plants as distinguished from flowers. As used subsequently herein, the term "flower basket" is intended to have the meaning ascribed to it by trade and custom, as just indicated, said term also serving to distinguish the within subject matter from a plant or flower container which is not supported by suspension and which therefore does not require the structural features which are part of the present invention.

Figure 1:
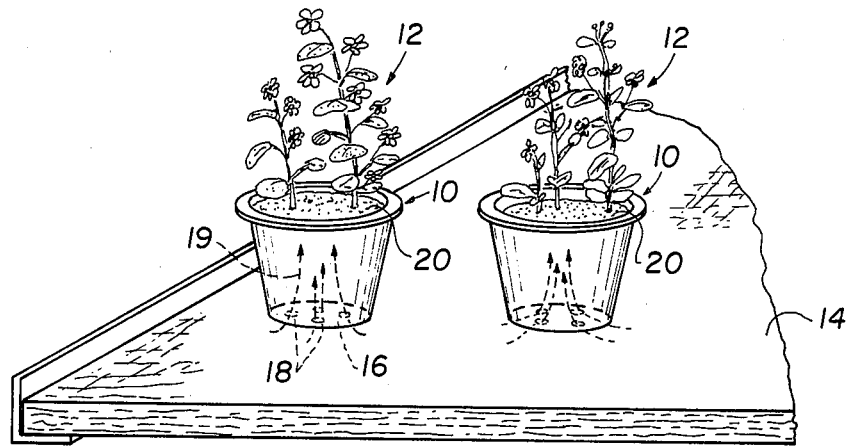
FIG. 1 is a partial perspective view illustrating the preferred manner in which plants or the like are cultivated for growth in a flower basket of the within invention.

Reference is now made to the drawings, and particularly to FIG. 1 wherein there is shown a plurality of flower baskets, generally designated 10, demonstrating objects and advantages of the present invention. The baskets 10 of FIG. 1 are not in their vertically suspended condition as would be the case when in use, as illustrated in FIG. 7, but rather are illustrated as they would be used by a farmer during the growing in each of the baskets 10 of a plant 12 in preparation for retail sales. In a typical commercial installation, the handling of large numbers of the flower baskets 10, in order to reduce their unit cost, contemplates the placement of the baskets 10 on a sponge or absorbent mat 14 which is periodically provided with the water supply necessary for the growth of the plants 12. To the above end, each flower basket 10 has a bottom wall 16 having circumferentially spaced openings 18 therein. While the openings 18 during use of the basket 10 in the home or by the retail customer provide a drainage function, as will be more particularly indicated, during the initial stages and the processing of the baskets 10 for retail sales, as illustrated in FIG. 1, the openings 18 provide access for the water content of the mat 14 to make its way, as along the path 19, into the planting earth 20.

Figure 2:
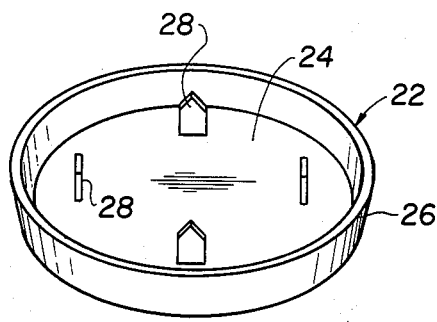
FIG. 2 is an isolated perspective view of the bottom saucer for the flower basket.

One of the significant aspects of the within invention is the ease in which the bottom saucer, more particularly designated 22 in FIG. 2, is connected about the bottom wall 16 of the basket 10. In this regard, each bottom saucer 22 includes a bottom wall 24, a peripheral side wall 26, and four upstanding connecting projections 28 circumferentially spaced about the bottom wall 24, in the same manner and relation as the four drainage openings 18 of the bottom wall 16 of the flower basket 10. As a consequence, and as best illustrated by progressive examination of FIGS. 3A—3C, following removal of the flower basket 10 from its supported position on the mat 14 during the growing of the plants 12, each basket 10 is then advantageously prepared for retail sale. This requires the use of a bottom saucer, such as the saucer 22, since planting earth 20 must be prevented from spilling from the openings 18 and, even more important, excess water placed in the growing earth 20 must be permitted to drain through the openings 18. In accordance with the present invention, bottom saucer 22 is readily connected to a cooperating flower basket 10 merely by aligning the four upstanding connecting projections 28 with the four drainage openings 18 and then pushing the connectors 28 through the openings 18, as in the direction 30. As best shown in FIG. 3B, projecting movement 30 of bottom saucer 22 occurs until the bottom wall 24 thereof encounters depending spacing projections 32 of the basket bottom wall 16. As a result of thrusting the projections 28 through the drainage openings 18, the sides 34 of each projection 28 are firmly engaged, in a friction fit, by the wall bounding each drainage opening 18. In fact, as illustrated in FIG. 3C, in slightly exaggerated fashion, it is contemplated that the width of each projection 28 will be slightly greater than the diameter of each drainage opening 18 so that during the thrust of the projections 28 through the openings 18 there will be a slight rupturing of the wall bounding each drainage opening 18, as at the locations 36, which, in an obvious manner, assures that there is a firm gripping contact established between the connectors 28 and the walls bounding the openings 18. The aforesaid rupturing at the locations 36 is facilitated by the angular orientation of the leading edges 38 of each projection 28. Additionally, the edges 38 form a point on each projection 28 which facilitates entry thereof into the planting earth 20. As illustrated in FIG. 3C, when the projections 28 are in their connected position within the drainage openings 18 there is still sufficient unused area in each of the openings to enable it to perform its drainage function.

Reference is now made to FIGS. 4–7 which best illustrate the structural details of the flower basket 10. The same includes a cylindrical body 40 which bounds a compartment 42 for the previously referred to planting earth 20. At the upper end of the body 40 which bounds the opening into the compartment 42, basket 10 has a circular, laterally extending flange 44 in which there is a circumferential arrangement of identically constructed keyhole-shaped slots 46, the function of which will soon be apparent. Clearly shown in FIG. 4 is the flower basket bottom wall 16 with the four drainage openings 18 circumferentially spaced thereabout. Between the openings 18 is a group of three of the previously noted depending spacing projections 32.

Completing the three-unit combination of the present invention, and as best illustrated in FIGS. 10, 11, is a connector, generally designated 50. Connector 50 is a plastic molded article of manufacture, being specifically molded of a pliable plastic such as "Celcone," commercially available from Celanese Corporation. The molding occurs in a common molding plane, as illustrated more particularly in FIG. 11. As such, the connector 50 is economically mass produced since it readily lends itself to injection molding. However, while it is molded and produced in a common plane, as illustrated in FIG. 11, the three depending elongated connecting members, more particularly designated 52 in FIG. 10, are, by virtue of the pliability of the plastic, readily separated from each other into an outwardly diverging configuration, as illustrated in FIG. 7.

At the point of convergence, or top of the members 52, as at 54, each connector 50 has a molded hook 56, by which it is readily connected to the elevated support for the flower basket 10. At the other or remote end of each of the connecting members 52, the same is molded with a half-spherical shape 58. Each shape 58 is of slightly enlarged size in relation to the diameter of each member 52 so that each shape 58 has a horizontally oriented basket-engaging surface 60.

Referring now to FIGS. 8 and 9, it should be readily appreciated that the connection between the connector 50 and the flower basket 10 is readily achieved by projecting each connecting member 52 through the larger opening 62 of a keyhole slot 46 and then laterally snapping each shape 58 in place in the small openings 64 of each slot 46. This, of course, positions the surface 60 in holding relation beneath the flower basket flange 44, all as is clearly illustrated in FIG. 9, thereby completing the assembly of the three-part flower basket 10 of the present invention. Not only is the assembly of the component parts rather simple and readily achieved, in the manner already described, but the flower basket 10 is economically produced because it is made entirely of plastic. In a preferred embodiment the container 40 is preferably molded of polypropylene, as is also the bottom saucer 22 and, as already noted, the connector 50 is preferably injection molded using "Celcone."

A latitude of modification, change and substitution is intended in the foregoing disclosure and in some instances some features of the invention will be employed without a corresponding use of other features. Accordingly, it is appropriate that the appending claims be construed broadly and in a manner consistent with the spirit and scope of the invention herein.

What is claimed is:

1. As an article of manufacture, the combination of a flower basket, a bottom saucer for said basket, and a plastic molded connector for suspending said flower basket and saucer in connected relation with each other from an elevated support: said flower basket comprising a cylindrical body bounding a compartment for a supply of earth for growing plants in said basket, said body having an upper opening into said compartment with a circular flange extending laterally thereabout, said flange having three keyhole slots circumferentially spaced thereabout, and a bottom wall on said body having four circumferentially spaced openings therein; said bottom saucer having four upstanding connecting projections in said same circumferential spacing as said bottom wall openings projecting in a force fit through said openings for achieving said connected relationship of said saucer with said flower basket; and said plastic molded connector comprising three connecting members which during the suspension of said flower basket have an operative condition circumferentially spaced from each other and diverging outwardly from a common point to their connection with said flower basket, an enlarged-sized projection at the end of each said connecting member adapted to be projected through a cooperating one of said keyhole slots and laterally snapped into place therein for completing said connection to said flower basket, a hook extending from said common point for completing a connection between said connector and said support, said connecting members being molded of a pliable plastic material in a common molding plane, said material being sufficiently pliable so that after said molding said connecting members are readily separated without breaking into plural planes as required by said operative outwardly diverging condition.

2. As an article of manufacture, the combination of a flower basket, a bottom saucer for said basket, and a plastic molded connector for suspending said flower basket and saucer in connected relation with each other from an elevated support: said flower basket comprising a shaped body bounding a compartment for a supply of earth for growing plaints in said basket, said body having an upper opening into said compartment with a circular flange extending laterally thereabout, said flange having three keyhole slots circumferentially spaced thereabout, and a bottom wall on said body having four circumferentially spaced openings therein; said bottom saucer having four upstanding connecting projections in said same circumferential spacing as said bottom wall openings projecting in a force fit through said openings for achieving said connected relationship of said saucer with said flower basket; and said plastic molded connector comprising three connecting members which during the suspension of said flower basket have an operative condition circumferentially spaced from each other and diverging outwardly from a common point to their connection with said flower basket, an enlarged-sized projection at the end of each said connecting member adapted to be projected through a cooperating one of said keyhole slots and laterally snapped into place therein for completing said connection to said flower basket, a hook extending from said common point for completing a connection between said connector and said support, said connecting members being molded of a pliable plastic material in a common molding plane, said material being sufficiently pliable so that after said molding said connecting members are readily separated without breaking into plural planes as required by said operative outwardly diverging condition.

* * * * *